(12) United States Patent
Al-Helal et al.

(10) Patent No.: US 11,434,168 B2
(45) Date of Patent: Sep. 6, 2022

(54) UTILIZATION OF HEAVY OIL FLY ASH TO PRODUCE CONTROLLED LOW STRENGTH MATERIAL FOR BACKFILLING APPLICATIONS

(71) Applicant: Saudi Arabian Oil Company, Dhahran (SA)

(72) Inventors: Zakariya Saleh Al-Helal, Dhahran (SA); Carlos Ernesto Acero, Dhahran (SA); Salah Al-Dulaijan, Dhahran (DE); Muhammad Kalimur Rahman, Dhahran (DE); Mohammed Ibrahim, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 297 days.

(21) Appl. No.: 16/815,805

(22) Filed: Mar. 11, 2020

(65) Prior Publication Data

US 2020/0290929 A1 Sep. 17, 2020

Related U.S. Application Data

(60) Provisional application No. 62/816,602, filed on Mar. 11, 2019.

(51) Int. Cl.
*C04B 28/04* (2006.01)

(52) U.S. Cl.
CPC .......... *C04B 28/04* (2013.01); *C04B 2201/50* (2013.01)

(58) Field of Classification Search
CPC ....... C04B 14/06; C04B 18/087; C04B 28/02; C04B 28/04; C04B 2111/00103; C04B 2111/00663; C04B 2111/00698; C04B 2111/00724; C04B 2201/50; Y02W 30/91
See application file for complete search history.

(56) References Cited

U.S. PATENT DOCUMENTS

| | | |
|---|---|---|
| 7,390,444 B2 | 6/2008 | Ramme et al. |
| 8,444,761 B2 | 5/2013 | Al-Mehthel et al. |
| 8,945,300 B2 | 2/2015 | Al-Mehthel et al. |
| 9,249,304 B2 | 2/2016 | Al-Mehthel et al. |
| 2002/0162484 A1 | 11/2002 | Ramme et al. |
| 2013/0118382 A1 | 5/2013 | Al-Mehthel et al. |
| 2015/0122148 A1 | 5/2015 | Wahhab et al. |
| 2018/0265405 A1 | 9/2018 | El Naggar et al. |

FOREIGN PATENT DOCUMENTS

| | | |
|---|---|---|
| IL | 105654 A | 6/1997 |
| IL | 115988 A | 9/1999 |
| KR | 101115950 B1 | 2/2012 |
| TW | I307335 B | 3/2009 |

OTHER PUBLICATIONS

Al-Osta, et al., "Study Of Heavy Fuel Oil Fly Ash For Use In Concrete Blocks And Asphalt Concrete Mixes," Advances in Concrete Construction, vol. 4, Issue 2, 2016, pp. 123-143.
Camilleri et al., "The microstructure and physical properties of heavy oil fuel ash replaced Portland cement for use in flowable fill concrete and the production of concrete masonry units", Construction and Building Materials, 2013, pp. 970-979.
Folliard, et al., "Development of a Recommended Practice for Use of Controlled Low-Strength Material in Highway Construction," National Academies of Sciences, Engineering, and Medicine, 2008, 150 pages.
International Search Report and Written Opinion for related PCT application PCT/US2020/021967 dated Jun. 15, 2020.
N. Rajendran, "Controlled Low Strength Materials (CLSM)," American Concrete Institute, Committee 229, ACI 229R-94 Report, 1994.
Paya et al., "Properties of Portland cement mortars incorporating high amounts of oil-fuel ashes", Waste Management, 1999, pp. 7.
Trejo, et al., "Sustainable development using controlled low-strength material," International Workshop on Sustainable Development and Concrete Technology, Jan. 2004, pp. 231-250.

*Primary Examiner* — Anthony J Green
(74) *Attorney, Agent, or Firm* — Bracewell LLP; Constance G. Rhebergen; Linda L. Morgan (57) ABSTRACT

A controlled low strength material has constituents that include a cement, an aggregate, a heavy oil fly ash, and a water. The controlled low strength material has a compressive strength in a range of 300 kPa to 2.1 MPa. In certain embodiments, the heavy oil fly ash can be part of a heavy oil fly ash slurry.

16 Claims, 3 Drawing Sheets

UTILIZATION OF HEAVY OIL FLY ASH TO PRODUCE CONTROLLED LOW STRENGTH MATERIAL FOR BACKFILLING APPLICATIONS

CROSS REFERENCE TO RELATED APPLICATION

This application claims priority to and the benefit of U.S. Provisional Application Ser. No. 62/816,602, filed Mar. 11, 2019, titled "Utilization Of Heavy Oil Fly Ash To Produce Controlled Low Strength Material For Backfilling Applications," the full disclosure of which is hereby incorporated herein by reference in its entirety for all purposes.

BACKGROUND OF THE DISCLOSURE

Field of the Disclosure

The present disclosure relates to a controlled low strength material to be used as backfilling material in construction. More specifically, the disclosure relates to a controlled low strength material having heavy oil fly ash and methods for making the same.

Description of the Related Art

Large quantities of heavy oil fly ash is generated as a byproduct or waste material by power generation and desalination plants. In view of the environmental protection policies that limit the release of such waste materials to the atmosphere, as a result of this the amount of heavy oil fly ash generated by these facilities will increase, posing a progressively greater challenge for the handling and disposing of heavy oil fly ash.

Controlled low strength material is a self-compacted, cementious material primarily used as a backfill in lieu of compacted backfill. The qualities that make controlled low strength material a desirable engineered material are the ability to self-consolidate or self-compact in a fresh state and the ability to be excavated after hardening.

Although controlled low strength material can be designed and produced in a similar way to concrete, there are substantial differences between controlled low strength material and concrete. Concrete is designed to resist large stresses in compression and can have a compressive strength in a range of 14 MPa to 80 MPa or higher. Typically, the durability of concrete is affected by the ability to protect the reinforcing steel from corrosion. Therefore it is desirable for concrete to have high density and low permeability. On the other hand, controlled low strength material (CLSM) is mainly used as a substitute for a strong soil and the ability to later excavate the controlled low strength material is an important parameter. This CLSM is generally referred to as "Excavatable CLSM". The compressive strength of the excavatable CLSM material should not typically exceed 300 KPa to 2.1 MPa. The CLSM can also be used for permanent applications such as under the isolated or raft foundations, wherein, it can be called as "Non-excavatable CLSM" with compressive strength less than 8.3 MPa. It is important to have a highly flowable CLSM mix without any bleeding, so that CLSM can penetrate into small cavities and corners. The maximum aggregate size in CLSM is generally limited to less than 10 mm diameter. In most applications CLSM has aggregates less than 4.76 mm diameter. Also because there is no reinforcement of any type in controlled low strength material, the permeability of controlled low strength material is not a critical feature of the controlled low strength material.

SUMMARY OF THE DISCLOSURE

Embodiments of this disclosure provide a controlled low strength material formed with heavy oil fly ash. The heavy oil fly ash can be combined with cement, aggregates, and water to produce the controlled low strength material to be used as soil backfill for cavities or trenches without the need for compaction or added consolidation.

The controlled low strength material of this disclosure can provide the flowability needed for easy placement of the controlled low strength material and the controlled low strength material will set, or settle, at least as quickly as currently available controlled low strength material that is formed with Portland cement. Further, the controlled low strength material will maintain a low strength in the long term. A low strength in the long term is important for being able to later excavate the controlled low strength material and this type of controlled low strength material is generally referred to as "Excavatable CLSM". This characteristic of controlled low strength material can be difficult to achieve with currently available controlled low strength material that is formed with cementious materials, such as with Portland cement, conventional fly ash, and other pozzolans.

In an embodiment of the disclosure, the constituents of a controlled low strength material include a cement, an aggregate, a heavy oil fly ash, and a water. The controlled low strength material has a compressive strength in a range of 300 kPa to 2.1 MPa.

In alternate embodiments of this disclosure the heavy oil fly ash can include carbon in an amount of 90 wt % to 95 wt % based on the weight of heavy oil fly ash. At least 80% of the heavy oil fly ash can have a particle size smaller than 45 micrometers.

In other alternate embodiments, the constituents of the controlled low strength material can include:
the cement in an amount of 2 wt % to 5 wt % of the constituents of the controlled low strength material;
the aggregate in an amount of 75 wt % to 95 wt % of the constituents of the controlled low strength material;
the heavy oil fly ash in an amount of 10 wt % to 50 wt % of the cement; and
the water in an amount of 10 wt % to 15 wt % of the constituents of the controlled low strength material, each based on the weight of the controlled low strength material.

In yet other alternate embodiments, the amount of aggregate with a particle size greater than 9.5 millimeters (mm) can be 10% or less of the amount of aggregate. Alternately, the aggregate can consist essentially of a natural fine aggregate and coarse aggregate that has a particle size of less than 4.75 mm.

In an alternate embodiment of this disclosure, a method for forming a controlled low strength material includes mixing together the following constituents: a cement; an aggregate; a heavy oil fly ash; and a mixing water. After mixing, the material has a compressive strength in a range of 300 kPa to 2.1 MPa.

In alternate embodiments, the heavy oil fly ash can include carbon in an amount of 90 wt % to 95 wt % based on the weight of heavy oil fly ash. At least 80% of the heavy oil fly ash can have a particle size smaller than 45 micrometers.

In other alternate embodiments, the constituents of the controlled low strength material can include:

the cement in an amount of 2 wt % to 5 wt % of the constituents of the controlled low strength material;

the aggregate in an amount of 75 wt % to 95 wt % of the constituents of the controlled low strength material;

the heavy oil fly ash in an amount of 10 wt % to 50 wt % of the cement; and the mixing water in an amount of 10 wt % to 15 wt % of the constituents of the controlled low strength material, each based on the weight of the controlled low strength material.

In yet other embodiments, the amount of aggregate with a particle size greater than 9.5 mm can be 10% or less of the amount of aggregate. The aggregate can consist essentially of a natural fine aggregate and coarse aggregate that has a particle size of less than 4.75 mm.

In another alternate embodiment of this disclosure, a method for forming a controlled low strength material includes mixing together constituents that include: a cement; an aggregate; a heavy oil fly ash slurry; and a mixing water. After mixing, the controlled low strength material has a compressive strength in a range of 300 kPa to 2.1 MPa.

In alternate embodiments, the heavy oil fly ash slurry can be added directly to the cement and the aggregate to produce the controlled low strength material. The heavy oil fly ash slurry can include a slurry water and a heavy oil fly ash. The slurry water and the mixing water together can be in an amount of 10 wt % to 20 wt % of the constituents of the controlled low strength material. The heavy oil fly ash can include carbon in an amount of 90 wt % to 95 wt % based on a weight of heavy oil fly ash. At least 80% of the heavy oil fly ash can have a particle size smaller than 45 micrometers. The amount of aggregate with a particle size greater than 9.5 mm can be 10% or less of the amount of aggregate. The aggregate can consist essentially of a fine aggregate and coarse aggregate that has a particle size of less than 4.75 mm.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

As used in the Specification and appended claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

According to embodiments of this disclosure, a controlled low strength material can be formed that includes a cement, an aggregate, a heavy oil fly ash, and a water. Each of the constituents are further described in this disclosure.

Cement

Cement is a binder that can bind the aggregate together. Ordinary Portland cement is an example of a binder that can bind to other materials, such as aggregates, thereby holding them together. A material that is a paste that can harden to bind materials together, in the manner of cement, is said to be a cementitious material or to have cementitious properties. The cement of embodiments of this disclosure can be, for example, a Type I or a Type-V Portland Cement as classified by the American Society for Testing and Materials (ASTM) such as in ASTM C150. However, any type of cement, including a pozzolanic cement, can be used to produce the controlled low strength material of this disclosure, as long as the cement is certified for compliance to an international accepted material standard.

Aggregate

As one of ordinary skill will appreciate, various types of conventional aggregates can be used as a filler. Fine aggregates used in embodiments of this disclosure, also referred to as "fines," can include natural sand, crushed stone, soil, or other suitable fine particles, with most particles smaller than 4.75 mm. Coarse aggregates used in embodiments of this disclosure generally include coarse aggregate with particle size between 2.36 mm to 4.75 mm.

A maximum particle size of the aggregate used in embodiments of this disclosure can be as large as 12.5 mm, however, the portion of aggregates larger than 9.5 mm should be 10 wt % or less, based on the weight of the aggregate. In alternate embodiments of this disclosure, the aggregate consists essentially of a fine aggregate and has a particle size of less than 4.75 mm. Including a coarse aggregate in the controlled low strength material can increase the strength of the controlled low strength material. Therefore by not including any coarse aggregate, the strength of the controlled low strength material can be maintained sufficiently low to allow for later excavation of the set controlled low strength material. In addition, plastic properties of the controlled low strength material in a fresh state, such as water demand and flowability, will be altered by including only fine aggregate, compared to a controlled low strength material that includes a coarse aggregate in addition to a fine aggregate. The water demand may increase in order to achieve a flowable controlled low strength material.

Heavy Oil Fly Ash

Heavy oil fly ash is a residue resulting from the combustion of heavy oil or cracked oil. Heavy oil is generally defined as fuel oil having relatively long hydrocarbon chains such as, for example, carbon lengths of between about 12-70 carbon atoms or between about 20-70 carbon atoms. Due to its high viscosity, heavy fuel oil is sometimes preheated before combustion in, for example, a power generation plant.

Cracking, in the oil refining industry, generally refers to breaking down complex organic molecules into simpler molecules by breaking the long-chain hydrocarbons into shorter hydrocarbon chains. Various processes can be used to crack oil including, for example, catalytic processes. After the cracking process, the resultant hydrocarbons can be separated into various types of fuel, including, for example, fuel gas, liquefied petroleum gas, gasoline, light cycle oils, and heavy fuel oil. The heavy fuel oil produced by the cracking process can be referred to as "cracked fuel oil." For purposes of this application, cracked fuel oil and heavy fuel oil are both referred to as a heavy oil, unless otherwise specified. Electricity production plants and water desalination plants can use heavy oil. An increase in the resulting heavy oil ash is expected due to additional environmental restrictions. Combustion of heavy oil produces residue, including heavy oil fly ash. The heavy oil fly ash can, and to some extent must, due to environmental restrictions, be captured rather than being released into the atmosphere.

Heavy oil fly ash is a black powder type of waste material that results from burning of heavy oil. Heavy oil fly ash has unique characteristics compared to other types of ash. Heavy oil fly ash is collected in the electrostatic precipitators, which are installed on boilers burning residual oil, for air pollution control. A current practice for the disposal of heavy oil fly ash is to bury the heavy oil fly ash in special lined and sealed pits which is very costly and requires large area to be reserved as dumping sites.

Heavy oil fly ash can include various particle sizes. In an embodiment of this disclosure, no more than 20% by weight of the heavy oil fly ash is retained on a #325 sieve, while at least 80% by weight of the material passes through the #325 sieve. This indicates that at least 80% by weight of the heavy oil fly ash can be finer than about 45 micrometers (microns).

Typically, heavy oil fly ash includes more than about 90% by weight carbon. The remaining less than about 10% by weight of the heavy oil fly ash can contain various elements. For example, Table 1 presents an example chemical analysis of a heavy oil fly ash. The amounts of each element can vary depending upon the source of the heavy oil fly ash.

TABLE 1

Elemental Composition of Example Embodiment of Heavy Oil Fly Ash

| Element | Weight, % (Range) |
|---|---|
| Carbon | 90-95 |
| Sulfur | 4-7 |
| Copper | 1-3 |

In embodiments of this disclosure, the heavy oil fly ash can include carbon in an amount of 90 wt % to 95 wt % based on the weight of heavy oil fly ash.

Table 2 presents an example physical properties of heavy oil fly ash. The properties can vary depending upon the source of the heavy oil fly ash.

TABLE 2

| Property | Values (Avg) |
|---|---|
| Bulk density by gas | 0.34 g/cm$^3$ |
| Bulk density by water | 1.67 g/cm$^3$ |
| True density by water | 1.98 g/cm$^3$ |
| Specific gravity | 0.34 |
| Grain size | 63.09 μm |
| Porosity by helium gas | 82.85% |
| Porosity by water | 22.03% |
| Moisture content | 0.9% |
| Loss on Ignition (LoI) | 95.2% |
| Ash content | 4.8% |

Table 3 presents example maximum concentrations of certain elements of heavy oil fly ash. The amounts can vary depending upon the source of the heavy oil fly ash.

TABLE 3

| Parameter | Value (mg/kg) |
|---|---|
| Silver | <10 |
| Aluminum | 406.2 |
| Arsenic | 2.90 |
| Barium | 14.65 |
| Calcium | 736.7 |
| Cadmium | 3.58 |
| Cobalt | 6.95 |
| Chromium | 63.88 |
| Copper | 17.58 |
| Iron | 20225 |
| Magnesium | 12622 |
| Manganese | 48.84 |
| Sodium | 1689 |
| Nickel | 4334 |
| Lead | 26.70 |
| Selenium | <1.0 |
| Vanadium | 15619 |
| Zinc | 34.19 |

Table 4 presents an example compound composition and other characteristics of heavy oil fly ash. The amounts of each compound can vary depending upon the source of the heavy oil fly ash.

TABLE 4

Compound Composition and Characteristics of
Example Embodiment of Heavy Oil Fly Ash

| Parameter | Weight, % (Range of Values) |
|---|---|
| $SiO_2$ | 1-2 |
| CaO | 0.4-1.0 |
| $Al_2O_3$ | <0.10 |
| $Fe_2O_3$ | 0.4-0.5 |
| MgO | 0.4-0.6 |
| $K_2O$ | 0.01-0.04 |
| $Na_2O$ | 0.5-1.0 |
| $V_2O5$ | 2.0-3.0 |
| Sulfur | 2-6 |
| $Na_2O$ + (0.658$K_2O$), % | 0.3-0.6 |
| Loss on ignition | 90-95 |
| Moisture % | 1-2 |
| Fineness (Material retained on # 325 sieve) | 10-20 |

The elemental and compound composition of the heavy oil fly ash used in embodiments of the present disclosure is substantially different from that of traditional fly ash.

Unlike heavy oil fly ash, traditional fly ash is generally produced by burning coal. The main chemical components of the traditional fly ash are silicon dioxide (SiO2), calcium oxide (CaO), aluminum oxide (Al2O3), and iron oxide (Fe2O3) and is in accordance with ASTM C618. Traditional fly ash is generally categorized depending on the type of coal burned. For example, class F fly ash is produced by burning anthracite and bituminous coal, while Class C fly ash is produced by burning lignite or sub-bituminous coal. Since traditional fly ash contains substantial amounts of silica, traditional fly ash reacts with calcium hydroxide, or lime, during the hydration of cement, making the cement dense and impermeable. As an example, a coal ash can contain 46.6 wt % CaO, 33.8 wt % SiO2 and 14.8 wt % SO4, based on the weight of traditional coal ash. With such amounts of CaO, SiO2, and SO4 there is only 4.8 wt % of any other compound in the traditional coal ash. Therefore such traditional coal ash could not contain at least 90 wt % carbon.

Embodiments of this disclosure are free of traditional fly ash. Because heavy oil fly ash contains at least 90 wt % carbon, heavy oil fly ash does not contribute to the formation of supplementary cement and is considered essentially non-cementious.

The morphology of an example heavy oil fly ash was evaluated utilizing scanning electron microscopy (SEM) and energy dispersive spectroscopy (EDS) analysis using a JEOL scanning electron microscope fitted with an energy dispersive X-ray analyzer model 5800 LV.

Figure 1:
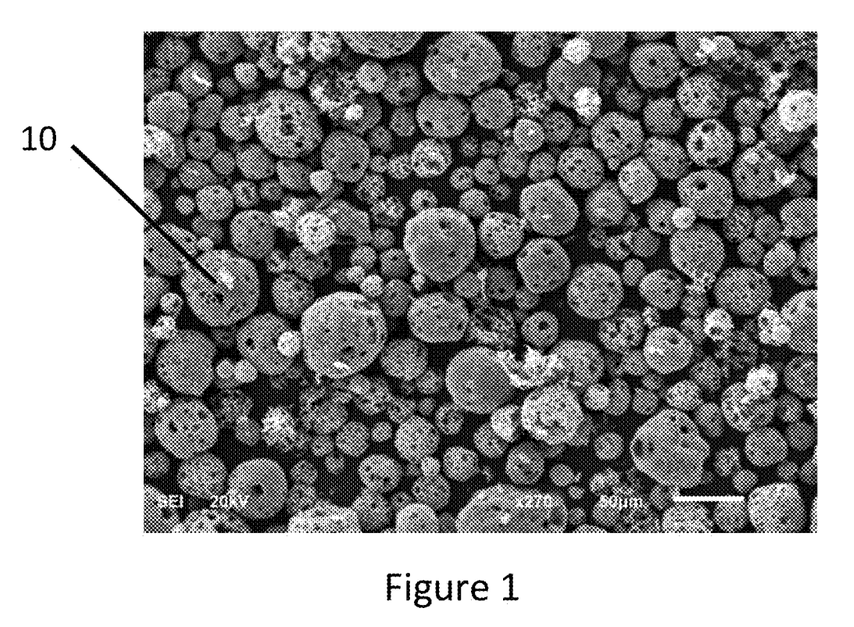
FIG. 1 is a scanning electron microscopy of an example of a heavy oil fly ash, in accordance with an embodiment of this disclosure, shown at a ×270 magnification and a scale of 50 μm.
Figure 2:
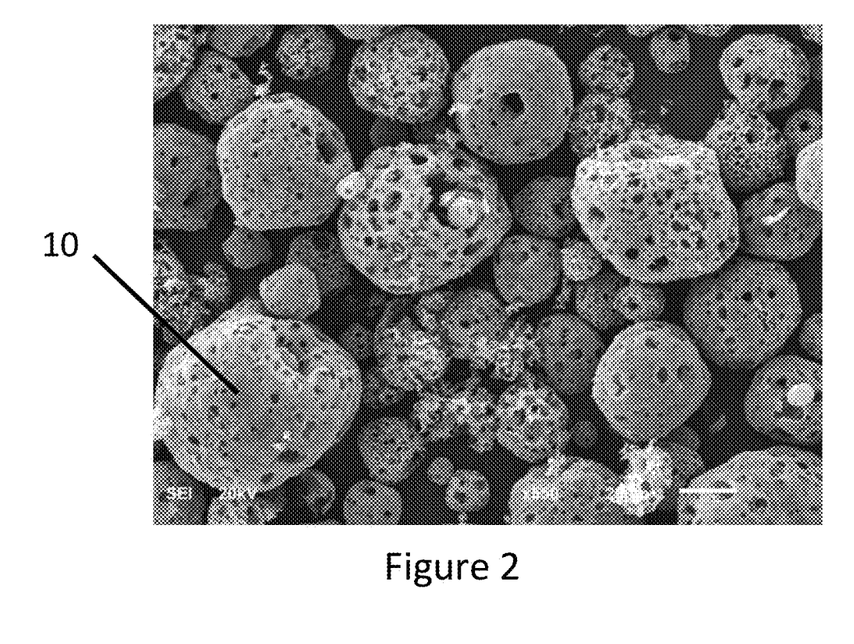
FIG. 2 is a scanning electron microscopy of an example of a heavy oil fly ash, in accordance with an embodiment of this disclosure, shown at a ×550 magnification of and a scale of 20 μm.

Looking at FIG. 1, an SEM image of heavy oil fly ash is shown a ×270 magnification and a scale of 50 µm. Looking at FIG. 2, an SEM image of heavy oil fly ash is shown an ×550 magnification and a scale of 20 µm. Looking at FIG. 3, an SEM image of heavy oil fly ash is shown a ×550 magnification and a scale of 10 µm. The heavy oil fly ash was composed of a variety of particles 10 which can be seen in FIGS. 1-3. The particles 10 of heavy oil fly ash were spherical in shape.

Figure 3:
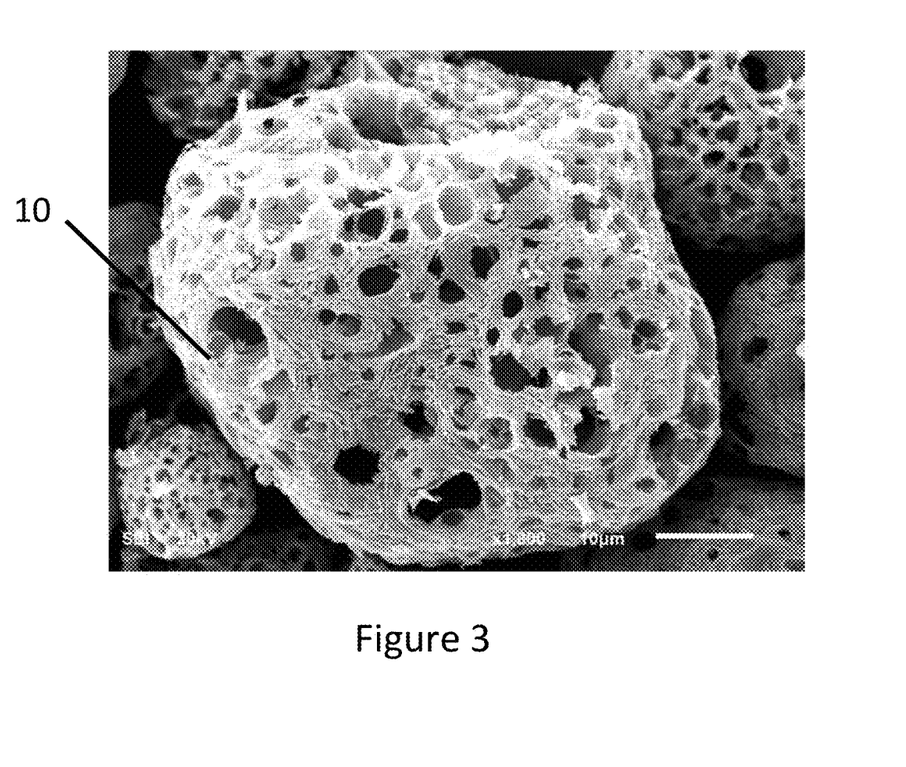
FIG. 3 is a scanning electron microscopy of an example of a heavy oil fly ash, in accordance with an embodiment of this disclosure, shown at a ×1,800 magnification and a scale of 10 μm.

SEM indicates that the surface of the heavy oil fly ash particles 10 was porous, as shown in FIG. 3 in a zoom-in-view.

Looking at Table 5, results of the EDS analysis are shown. Measurements were made in five spots of a test sample. The results of the EDS analysis show the existence of unburned carbon (C) in higher proportions, in a range of 92-95%.

The high percentage of carbon content in the heavy oil fly ash was also confirmed by the loss-on-ignition test which gave a result of 90-95% carbon content, as shown in Table 4. Low quantities of Sulphur (S) in a range or 5-5.5% and Copper (Cu) in a range of 2.4 to 2.6% can be noted. Broad spectrum EDS analysis demonstrated the main elemental peak of carbon accompanied by smaller peaks of other trace elements including magnesium (Mg), nickel (Ni), aluminum (Al), iron (Fe), sodium (Na), calcium (Ca) and Tantalum (Ta)

Figure 4:
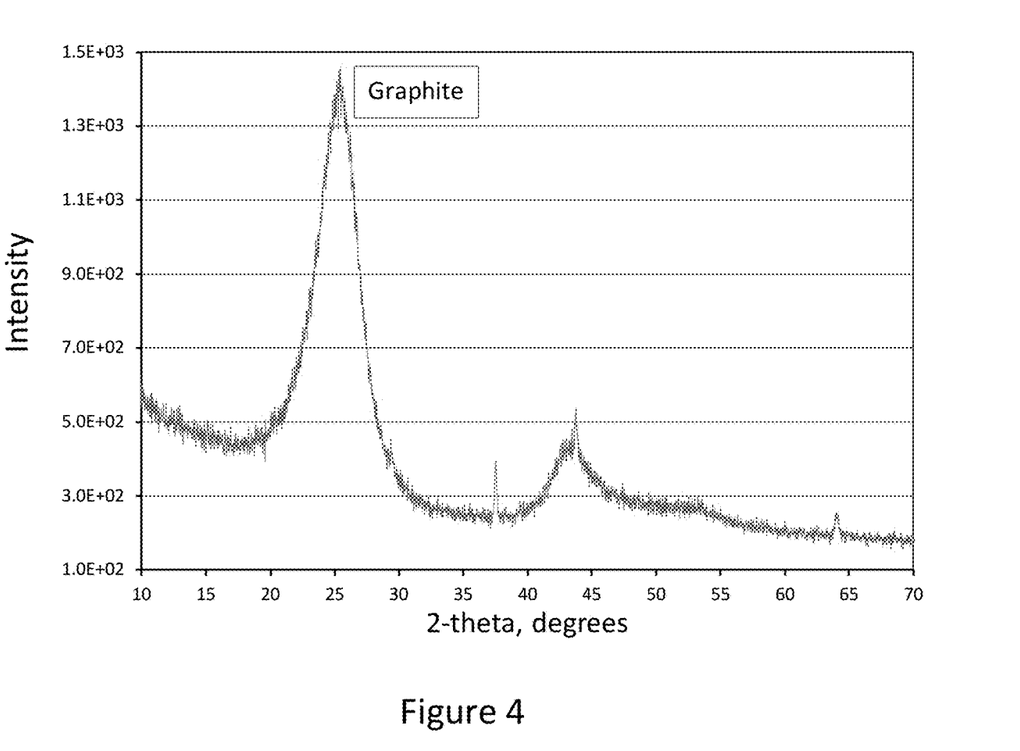
FIG. 4 is a graph showing the result of an x-ray diffraction analysis of an example of a heavy oil fly ash, in accordance with an embodiment of this disclosure.

HOFA is an amorphous material. XRD analysis of the HOFA in this disclosure is shown in FIG. 4. Graphite in evident in the XRD which is indicative of the high carbon.

TABLE 5

| | Element Weight, % | | | | | |
|---|---|---|---|---|---|---|
| Element | Spot 1 | Spot 2 | Spot 3 | Spot 4 | Spot 5 | Avg. |
| C | 92.5 | 92.1 | 92.4 | 92.5 | 94.6 | 92.8 |
| S | 5.0 | 5.6 | 5.1 | 4.9 | 5.4 | 5.2 |
| Cu | 2.6 | 2.4 | 2.5 | 2.6 | 2.5 | 2.5 |

Water

Water can be added to dry cement to make cement paste. The water-cement ratio ("w/c ratio") of a typical Portland cement can be between about 0.20 and 0.50. By way of explanation, a w/c ratio of 0.20 indicates that there is one part water to five parts Portland cement (1/5=0.20). A w/c ratio of 0.50 indicates one part water to two parts cement. Embodiments of this disclosure include a w/c ratio in a range of 1.0 and 3.0. The ratio of water and fine cementious material will balance the strength and flowablility of the resulting controlled low strength material.

The water used to form the controlled low strength material can be fresh and free of oil and other contaminants, with foreign particles not exceeding the limits established for concrete mixing.

In an embodiment, the heavy oil fly ash can be part of a slurry that is made by mixing an appropriate quantity of water with the fine heavy oil fly ash. This heavy oil fly ash slurry can be added directly to the cement, aggregate, and any additional required mixing water. By first pre-blending a heavy oil fly ash slurry, the environmental hazard associated with the handling of dry ultrafine heavy oil fly ash directly with the cement and aggregate can be reduced. The amount of water used to produce the heavy oil fly ash slurry, can be added to the total amount of mixing water, used to form the controlled low strength material. In certain embodiment, the combined total of the slurry water and the mixing water can be in an amount of 10 wt % to 20 wt % of the constituents of the controlled low strength material, based on the weight of the controlled low strength material.

The Controlled Low Strength Material

In preparing the controlled low strength material the range of wt % each of the constituents, which include a cement, an aggregate, a heavy oil fly ash, and a water, can be found in Table 6. As used in Table 6, the unit wt % is measured relative to the weight of the controlled low strength material, except for the heavy oil fuel ash, which is measured relative to the weight of the cement.

TABLE 6

| Constituent | Range of Amount wt % |
|---|---|
| Cement | 2 to 5 |
| Aggregate | 75 to 95 |
| Heavy Oil Fuel Ash (By weight of cement) | 10% to 50% |
| Water | 10 to 15 |

Table 7 shows examples of typical mix design used for developing a controlled low strength material using ordinary Portland cement (OPC), natural fine aggregate (NFA), natural coarse aggregate (NCA) and water. The total aggregate (TA) is the sum of the NFA and the NCA.

TABLE 7

| Mix # | OPC, kg/m³ | Water, kg/m³ | FA/TA | CA/TA | NFA, kg/m³ | NCA, kg/m³ |
|---|---|---|---|---|---|---|
| M1 | 90 | 243 | 0.6 | 0.4 | 1126 | 751 |
| M2 | 100 | 200 | 0.5 | 0.5 | 991 | 991 |
| M3 | 100 | 250 | 0.6 | 0.4 | 1166 | 777 |

Table 8 shows examples of typical mix design used for developing a controlled low strength material mixes with heavy oil fuel ash (HOFA), using ordinary Portland cement. The HOFA in the example mixes of Table 8 are replacing cement in amounts of 10%, 20%, 30%, 40% and 50% of the weight of cement. The mixes of Table 8 further include NFA, NCA, and water.

TABLE 8

| Mix # | HOFA, % | OPC, kg/m³ | HOFA, kg/m³ | Water, kg/m³ | NFA, kg/m³ | NCA, kg/m³ |
|---|---|---|---|---|---|---|
| M4 | 10% | 90 | 10 | 320 | 1030 | 687 |
| M5 | 20% | 80 | 20 | 325 | 1053 | 702 |
| M6 | 30% | 70 | 30 | 330 | 1077 | 718 |
| M7 | 40% | 60 | 40 | 330 | 1107 | 738 |
| M8 | 50% | 50 | 50 | 340 | 1129 | 753 |

Both water and cement are required to form a paste that can easily bind the aggregate. In certain embodiments, the controlled low strength material can be free of traditional fly ash, plasticizers, and fiber.

In alternate embodiments, the controlled low strength material can include a plasticizer or entrained air admixtures to achieve the desired consistency.

The controlled low strength material with HOFA formed in accordance with embodiments of this disclosure have a unit weight ranging from 1985-2040 kg/m³. Table 9 shows the example of unit weight for controlled low strength material mixes with HOFA. An example mix with only OPC is included for comparison purpose. The controlled low strength material with HOFA has a slightly higher unit weight.

TABLE 9

| Mix | Mix Details | # | L, mm | W, mm | H, mm | Weight, gr | Unit Weight, kg/m³ | Avg. Unit Weight, kg/m³ |
|---|---|---|---|---|---|---|---|---|
| M1 | 90 kg/m³ of OPC | 1 | 51.3 | 50.2 | 52 | 272.3 | 2045 | 2048 |
|  |  | 2 | 50.3 | 50.7 | 51 | 266.7 | 2035 |  |
|  |  | 3 | 51.3 | 50.7 | 52 | 279.3 | 2065 |  |
| M2 | 100 kg/m³ of OPC | 1 | 50.1 | 51.3 | 52 | 275.9 | 2064 | 2050 |
|  |  | 2 | 50.3 | 51.7 | 52 | 276.3 | 2047 |  |
|  |  | 3 | 51.1 | 50.7 | 51 | 270.9 | 2038 |  |
| M3 | 100 kg/m³ of OPC | 1 | 50.5 | 52.3 | 52 | 280.2 | 2052 | 2074 |
|  |  | 2 | 50.3 | 51.2 | 52 | 277.9 | 2087 |  |
|  |  | 3 | 50.3 | 51.2 | 52 | 277.3 | 2083 |  |
| M4 | 10% HOFA | 1 | 52 | 52 | 51 | 279.5 | 2027 | 2037 |
|  |  | 2 | 51.3 | 50.7 | 51 | 270.9 | 2030 |  |
|  |  | 3 | 52.1 | 50.7 | 51 | 278.3 | 2054 |  |
| M5 | 20% HOFA | 1 | 52.9 | 51.4 | 51.0 | 279.3 | 2014 | 2012 |
|  |  | 2 | 52.0 | 51.3 | 51.8 | 277.5 | 2008 |  |
|  |  | 3 | 51.0 | 51.3 | 52.0 | 273.9 | 2013 |  |
| M6 | 30% HOFA | 1 | 52.9 | 50 | 51 | 270.5 | 2013 | 2007 |
|  |  | 2 | 50.2 | 51.3 | 53 | 271.7 | 2002 |  |
|  |  | 3 | 50.1 | 52.7 | 52 | 275.3 | 2005 |  |
| M7 | 40% HOFA | 1 | 50.5 | 50.3 | 52 | 265.3 | 2009 | 2005 |
|  |  | 2 | 50 | 51.3 | 52 | 266.9 | 2001 |  |
|  |  | 3 | 50 | 51.8 | 52 | 271.7 | 2006 |  |
| M8 | 50% HOFA | 1 | 50 | 51.8 | 52 | 265.9 | 1974 | 1985 |
|  |  | 2 | 51.3 | 51 | 52 | 271.1 | 1993 |  |
|  |  | 3 | 51.4 | 52 | 52 | 276.5 | 1989 |  |

The controlled low strength material formed in accordance with embodiments of this disclosure can be self-consolidating or flowable fill. When tested in accordance with ASTM D6103 Test Method for Flow Consistency of Controlled Low Strength Material, an open-ended cylinder is placed on a flat, level surface and filled with fresh controlled low strength material. The cylinder is then raised quickly so that the controlled low strength material will flow into a patty. The average diameter of the patty is measured. When tested in accordance with ASTM D6103 Test Method for Flow Consistency of Controlled Low Strength Material, the controlled low strength material of embodiments of this disclosure can provide a patty with an average diameter between 200 mm and 250 mm without any segregation.

The controlled low strength material with HOFA formed in accordance with embodiments of this disclosure is a highly flowable mix. The spherical particles of HOFA with 90-95% carbon aids in the making a self-consolidating controlled low strength material mix with high flowability. As per ASTM D6103, the flowability of the controlled low strength material mix should be in the range of 200-300 mm. Table 10 shows examples of the flowability achieved for controlled low strength material mixes made with OPC only and with OPC replaced by HOFA up to 50%, where the percentage of HOFA is by weight of cement. The flow of concrete measurements shown in Table 10 were taken for four samples of each mix and an average flow of CLSM was calculated.

TABLE 10

| Mix # | Mix Details | Flow of CLSM, mm | | | | |
|---|---|---|---|---|---|---|
| | | 1 | 2 | 3 | 4 | Avg. |
| M1 | 90 kg/m³ of OPC | 197 | 199 | 198 | 195 | 197 |
| M2 | 100 kg/m³ of OPC | 197 | 202 | 203 | 198 | 200 |
| M3 | 100 kg/m³ of OPC | 207 | 206 | 203 | 205 | 205 |
| M4 | 10% replacement of OPC with HOFA | 205 | 203 | 204 | 203 | 204 |
| M5 | 20% replacement of OPC with HOFA | 202 | 201 | 203 | 205 | 203 |
| M6 | 30% replacement of OPC with HOFA | 207 | 205 | 204 | 206 | 206 |

TABLE 10-continued

| Mix # | Mix Details | Flow of CLSM, mm | | | | |
|---|---|---|---|---|---|---|
| | | 1 | 2 | 3 | 4 | Avg. |
| M7 | 40% replacement of OPC with HOFA | 203 | 202 | 205 | 204 | 204 |
| M8 | 50% replacement of OPC with HOFA | 203 | 20.7 | 204 | 203 | 204 |

The controlled low strength material with HOFA formed in accordance with embodiments of this disclosure shows no bleeding or segregation in spite of the large quantity of the water used. Excessive bleeding will result in segregation of the aggregates which inhibits the flowability of the controlled low strength material mixes. The porous HOFA particles in embodiments act as micro sponges which require a significant amount of water, but which also hold water, preventing any bleeding. Although there are no current standards specifying the limits on bleeding water, for practical limits Dickson et al. (Dickson, Y. S., Y. Ivan, and M. C. Irene (2014) Development of controlled low-strength material derived from beneficial reuse of bottom ash and sediment for green construction. Constr. Build. Mater. v. 64, pp. 201-207.) suggests that the bleeding rate should be limited to 5% for the bleeding tests conducted using ASTM C232/232M-14 (2014).

The controlled low strength material formed in accordance with embodiments of this disclosure has a compressive strength in a range of 200 kPa to 2.1 MPa. Table 11 shows for example the compressive strength of the controlled low strength material mixes at ages of 2, 3, 7 and 28 days. For controlled low strength material mixes with OPC it can be seen that the strength at an early age (2 days) is substantially higher than 200-300 kPa. The compressive strength increases with age to about 4 MPa at 7 days. However, no further increase is observed in the compressive strength at 28 days. The higher compressive strength in the OPC only controlled low strength material mixes make it a non-excavatable controlled low strength material.

Table 11 shows that controlled low strength material mixes with HOFA with OPC cement replacement ranging from 10% to 50% of the weight of OPC meet the criteria for an excavatable controlled low strength material. The compressive strength of these mixes ranges from 240 kPa to 610 kPa at 2 days, with lower values at higher percentage of replacement. The rate of strength gain for all controlled low strength material mixes with HOFA is very slow and it increases ranging from to 600 kPa to 1.2 MPa at 7 days. The long-term strength gain controlled low strength material mixes with HOFA is not excessive and the developed controlled low strength material with HOFA will be a truly excavatable controlled low strength material.

TABLE 11

| Mix | Mix Details | # | 2 days | | | 3 days | | |
|---|---|---|---|---|---|---|---|---|
| | | | Load, kN | Comp Strength, MPa | Avg Str, MPa | Load, kN | Comp Strength, MPa | Avg Str, MPa |
| M1 | 90 kg/m³ of OPC | 1 | 2.5 | 1 | 0.92 | 3.5 | 1.4 | 1.28 |
| | | 2 | 2.3 | 0.92 | | 3.2 | 1.28 | |
| | | 3 | 2.1 | 0.84 | | 2.9 | 1.16 | |
| M2 | 100 kg/m³ of OPC (50% CA + 50% FA) | 1 | 5.9 | 2.36 | 2.60 | 8.7 | 3.48 | 3.40 |
| | | 2 | 6.7 | 2.68 | | 8 | 3.2 | |
| | | 3 | 6.9 | 2.76 | | 8.8 | 3.52 | |
| M3 | 100 kg/m³ of OPC (40% CA + 60% FA) | 1 | 5.5 | 2.2 | 2.48 | 9.1 | 3.64 | 3.57 |
| | | 2 | 6.3 | 2.52 | | 8.8 | 3.52 | |
| | | 3 | 6.8 | 2.72 | | 8.9 | 3.56 | |
| M4 | 10% HOFA | 1 | 1.6 | 0.64 | 0.61 | 2.3 | 0.92 | 1.01 |
| | | 2 | 1.3 | 0.52 | | 2.6 | 1.04 | |
| | | 3 | 1.7 | 0.68 | | 2.7 | 1.08 | |
| M5 | 20% HOFA | 1 | 1 | 0.4 | 0.39 | 1.7 | 0.68 | 0.73 |
| | | 2 | 0.8 | 0.32 | | 2.2 | 0.88 | |
| | | 3 | 1.1 | 0.44 | | 1.6 | 0.64 | |
| M6 | 30% HOFA | 1 | 0.7 | 0.28 | 0.28 | 1.2 | 0.48 | 0.57 |
| | | 2 | 0.7 | 0.28 | | 1.3 | 0.52 | |
| | | 3 | 0.7 | 0.28 | | 1.8 | 0.72 | |
| M7 | 40% HOFA | 4 | 0.7 | 0.28 | 0.29 | 1.4 | 0.56 | 0.56 |
| | | 5 | 0.8 | 0.32 | | 1.2 | 0.48 | |
| | | 6 | 0.7 | 0.28 | | 1.6 | 0.64 | |
| M8 | 50% HOFA | 7 | 0.6 | 0.24 | 0.24 | 1.4 | 0.56 | 0.47 |
| | | 8 | 0.6 | 0.24 | | 1 | 0.4 | |
| | | 9 | 0.6 | 0.24 | | 1.1 | 0.44 | |

| Mix | Mix Details | # | 7 days | | | 28 days | | |
|---|---|---|---|---|---|---|---|---|
| | | | Load, kN | Comp Strength, MPa | Avg Str, MPa | Load, kN | Comp Strength, MPa | Avg Str, MPa |
| M1 | 90 kg/m³ of OPC | 1 | 8.8 | 3.52 | 3.53 | 9.2 | 3.68 | 3.60 |
| | | 2 | 8.7 | 3.48 | | 9 | 3.6 | |
| | | 3 | 9 | 3.6 | | 8.8 | 3.52 | |
| M2 | 100 kg/m³ of OPC (50% CA + 50% FA) | 1 | 9.9 | 3.96 | 4.24 | 11.3 | 4.52 | 4.36 |
| | | 2 | 10.8 | 4.32 | | 10.3 | 4.12 | |
| | | 3 | 11.1 | 4.44 | | 11.1 | 4.44 | |
| M3 | 100 kg/m³ of OPC (40% CA + 60% FA) | 1 | 11.9 | 4.76 | 4.49 | 10.1 | 4.04 | 4.56 |
| | | 2 | 10.3 | 4.12 | | 12.8 | 5.12 | |
| | | 3 | 11.5 | 4.6 | | 11.3 | 4.52 | |
| M4 | 10% HOFA | 1 | 2.9 | 1.16 | 1.19 | 4.3 | 1.72 | 1.71 |
| | | 2 | 3.1 | 1.24 | | 4.1 | 1.64 | |
| | | 3 | 2.9 | 1.16 | | 4.4 | 1.76 | |
| M5 | 20% HOFA | 1 | 2 | 0.8 | 0.87 | 3.5 | 1.4 | 1.49 |
| | | 2 | 2.3 | 0.92 | | 3.9 | 1.56 | |
| | | 3 | 2.2 | 0.88 | | 3.8 | 1.52 | |
| M6 | 30% HOFA | 1 | 1.9 | 0.76 | 0.72 | 3.7 | 1.48 | 1.40 |
| | | 2 | 1.7 | 0.68 | | 3.5 | 1.4 | |
| | | 3 | 1.8 | 0.72 | | 3.3 | 1.32 | |
| M7 | 40% HOFA | 4 | 1.9 | 0.76 | 0.72 | * | * | * |
| | | 5 | 1.8 | 0.72 | | * | | |
| | | 6 | 1.7 | 0.68 | | * | | |
| M8 | 50% HOFA | 7 | 1.5 | 0.6 | 0.59 | * | * | * |
| | | 8 | 1.4 | 0.56 | | * | | |
| | | 9 | 1.5 | 0.6 | | * | | |

In order to form the controlled low strength material, the constituents of the controlled low strength material can be batched in stationary concrete batch plants in general conformance with ASTM C94, or mixed in mobile volumetric mixing plants in accordance with ASTM C685. In each case, there may be necessary adjustment or modifications to the plant fixtures or process to allow for introducing the heavy oil fuel ash in an accurately-measured amounts.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A controlled low strength material, constituents of the controlled low strength material including:
   a cement in an amount of 2 wt % to 5 wt % of the constituents of the controlled low strength material;
   an aggregate in an amount of 75 wt % to 95 wt % of the constituents of the controlled low strength material;
   a heavy oil fly ash in an amount of 10 wt % to 50 wt % of the cement; and
   a water in an amount of 10 wt % to 15 wt % of the constituents of the controlled low strength material, each based on a weight of the controlled low strength material; where
the controlled low strength material has a compressive strength that does not exceed 2.1 MPa, measured at 28 days.

2. The controlled low strength material of claim 1, where the heavy oil fly ash includes carbon in an amount of 90 wt % to 95 wt % based on a weight of heavy oil fly ash.

3. The controlled low strength material of claim 1, where at least 80% of the heavy oil fly ash has a particle size smaller than 45 micrometers.

4. The controlled low strength material of claim 1, where an amount of aggregate with a particle size greater than 9.5 mm is 10% or less of the amount of aggregate.

5. The controlled low strength material of claim 1, where the aggregate consists essentially of a natural fine aggregate that has a particle size of less than 4.75 mm and a coarse aggregate.

6. A method for forming a controlled low strength material, the method including:
   mixing together constituents that include:
      a cement in an amount of 2 wt % to 5 wt % of the constituents of the controlled low strength material;
      an aggregate in an amount of 75 wt % to 95 wt % of the constituents of the controlled low strength material;
      a heavy oil fly ash in an amount of 10 wt % to 50 wt % of the cement; and
      a water in an amount of 10 wt % to 15 wt % of the constituents of the controlled low strength material; where
after mixing, the controlled low strength material has a compressive strength that does not exceed 2.1 MPa, measured at 28 days.

7. The method of claim 6, where the heavy oil fly ash includes carbon in an amount of 90 wt % to 95 wt % based on a weight of heavy oil fly ash.

8. The method of claim 6, where at least 80% of the heavy oil fly ash has a particle size smaller than 45 micrometers.

9. The method of claim 6, where an amount of aggregate with a particle size grater than 9.5 mm is 10% or less of the amount of aggregate.

10. The method of claim 6, where the aggregate consists essentially of a fine aggregate that has a particle size of less than 4.75 mm, and a coarse aggregate.

11. A method for forming a controlled low strength material, the method including mixing together constituents that include:
    a cement;
    an aggregate;
    a heavy oil fly ash slurry; and
    a mixing water; where
the heavy oil fly ash slurry includes a slurry water and a heavy oil fly ash, and where the slurry water and the mixing water together are in an amount of 10 wt % to 20 wt % of the constituents of the controlled low strength material; and after mixing, the controlled low strength material has a compressive strength that does not exceed 2.1 MPa, measured at 28 days.

12. The method of claim 11, further including adding the heavy oil fly ash slurry directly to the cement and the aggregate to produce the controlled low strength material.

13. The method of claim 11, where the heavy oil fly ash includes carbon in an amount of 90 wt % to 95 wt % based on a weight of heavy oil fly ash.

14. The method of claim 11, where at least 80% of the heavy oil fly ash has a particle size smaller than 45 micrometers.

15. The method of claim 11, where the amount of aggregate with a particle size greater than 9.5 mm is 10% or less of the amount of aggregate.

16. The method of claim 11, where the aggregate consists essentially of a fine aggregate that has a particle size of less than 4.75 mm, and a coarse aggregate.

* * * * *

UNITED STATES PATENT AND TRADEMARK OFFICE
CERTIFICATE OF CORRECTION

PATENT NO. : 11,434,168 B2
APPLICATION NO. : 16/815805
DATED : September 6, 2022
INVENTOR(S) : Zakariya Saleh Al-Helal et al.

It is certified that error appears in the above-identified patent and that said Letters Patent is hereby corrected as shown below:

In the Claims

In Claim 9, Column 14 Line 7:
"grater"
Should read:
"greater"

Signed and Sealed this
Eighth Day of November, 2022

Katherine Kelly Vidal
*Director of the United States Patent and Trademark Office*